(12) United States Patent
Kudoh et al.

(10) Patent No.: US 10,079,989 B2
(45) Date of Patent: Sep. 18, 2018

(54) IMAGE CAPTURING DEVICE

(71) Applicants: Yuusuke Kudoh, Osaka (JP); Yuuya Miyoshi, Osaka (JP)

(72) Inventors: Yuusuke Kudoh, Osaka (JP); Yuuya Miyoshi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/378,959

(22) Filed: Dec. 14, 2016

(65) Prior Publication Data

US 2017/0171483 A1 Jun. 15, 2017

(30) Foreign Application Priority Data

Dec. 15, 2015 (JP) ................. 2015-244369
Nov. 25, 2016 (JP) ................. 2016-229010

(51) Int. Cl.
*H04N 3/14* (2006.01)
*H04N 5/335* (2011.01)
*H04N 5/374* (2011.01)
*H04N 5/376* (2011.01)

(52) U.S. Cl.
CPC ............. *H04N 5/374* (2013.01); *H04N 5/376* (2013.01)

(58) Field of Classification Search
CPC ...... H04N 5/361; H04N 5/378; H04N 5/3575; H04N 5/335; H04N 5/365; H04N 3/155; H01L 27/14831
See application file for complete search history.

(56) References Cited

U.S. PATENT DOCUMENTS

| | | | | |
|---|---|---|---|---|
| 2006/0038902 A1* | 2/2006 | Boemler | ............... | H04N 3/1568 348/294 |
| 2009/0033779 A1* | 2/2009 | Mo | ........................ | H04N 5/361 348/308 |
| 2010/0039544 A1 | 2/2010 | Tejada et al. | | |
| 2012/0038809 A1* | 2/2012 | Lee | ...................... | H04N 5/3575 348/308 |
| 2013/0069808 A1* | 3/2013 | Reddy | ................. | H03M 1/1019 341/118 |
| 2014/0055291 A1 | 2/2014 | Kimura et al. | | |
| 2014/0347199 A1 | 11/2014 | Kimura et al. | | |
| 2015/0009386 A1* | 1/2015 | Komaba | ................. | H03M 1/56 348/308 |
| 2015/0288377 A1 | 10/2015 | Kimura et al. | | |

(Continued)

FOREIGN PATENT DOCUMENTS

| | | |
|---|---|---|
| JP | 2007-336477 | 12/2007 |
| JP | 2010-041221 | 2/2010 |

(Continued)

*Primary Examiner* — Kelly L Jerabek
(74) *Attorney, Agent, or Firm* — Oblon, McClelland, Maier & Neustadt, L.L.P.

(57) ABSTRACT

An image capturing device includes a pixel circuit, a programmable-gain amplifier, an analog-to-digital conversion circuit, and a control circuit. The pixel circuit outputs a photoreception signal. The programmable-gain amplifier amplifies the photoreception signal with a first gain. The analog-to-digital conversion circuit further amplifies the amplified signal that has been amplified by the programmable-gain amplifier, with a second gain by having a circuit configuration changeable by control, and digitally converts the resultant signal. The control circuit controls the analog-to-digital conversion circuit.

12 Claims, 14 Drawing Sheets

(56) References Cited

U.S. PATENT DOCUMENTS

2017/0054931 A1\* 2/2017 Wang ................ H04N 5/378
2017/0171483 A1   6/2017 Kudoh et al.
2017/0251156 A1   8/2017 Kudoh et al.
2017/0324883 A1\* 11/2017 Konno ............... H04N 5/3742

FOREIGN PATENT DOCUMENTS

| JP | 2011-109352 | 6/2011 |
| JP | 5657783 | 12/2014 |
| JP | 2017-38157 A | 2/2017 |
| JP | 2017-112605 A | 6/2017 |
| JP | 2017-158176 A | 9/2017 |

\* cited by examiner

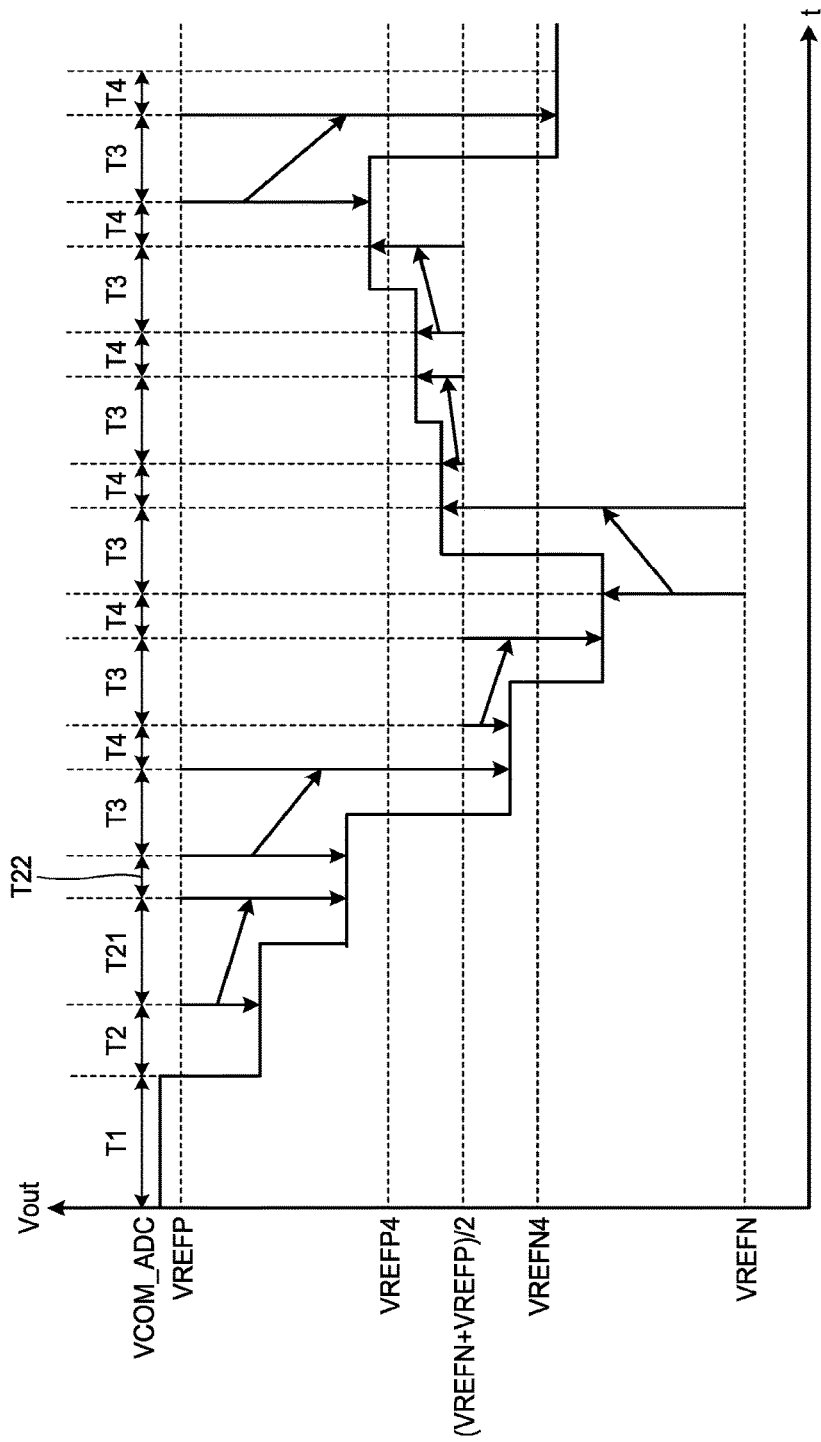

IMAGE CAPTURING DEVICE

CROSS-REFERENCE TO RELATED APPLICATIONS

The present application claims priority under 35 U.S.C. § 119 to Japanese Patent Application No. 2015-244369, filed on Dec. 15, 2015 and Japanese Patent Application No. 2016-229010, filed on Nov. 25, 2016. The contents of which are incorporated herein by reference in their entirety.

BACKGROUND OF THE INVENTION

1. Field of the Invention

The present invention relates to an image capturing device.

2. Description of the Related Art

A complementary metal-oxide semiconductor (CMOS) is available as one kind of image sensor used for image input in an electronic device (for example, a copier or a facsimile). A CMOS image sensor amplifies a signal from a pixel through a programmable-gain amplifier (PGA), performs analog-to-digital (AD) conversion on the amplified signal through an analog-to-digital converter (ADC), and outputs the resultant digital signal. Each unit, such as each pixel or each column in a pixel array, needs to be provided with such a PGA and an ADC. A pixel pitch is as narrow as several micrometers. For this reason, when such circuits are integrated on chips, the areas occupied thereby need to be as small as possible so as to be within the pitch width. One technique often employed in effort to satisfy this need is employment of a ramp ADC or a cyclic ADC as an ADC.

There is a document that discloses an invention aimed at obtaining a gain through a PGA in a CMOS image sensor. The document discloses a technique that: segments an output signal of correlated double sampling (CDS) into a plurality of regions in accordance with the intensity of the signal; and amplifies each segmented region of the signal through the PGA with a gain set for the each region (refer to Japanese Unexamined Patent Application Publication No. 2010-41221).

However, a conventional configuration is accompanied by the need to enlarge the size of an element in an attempt to increase a gain of a PGA. Specifically in this case, since a PGA is not allowed to be within a pixel pitch (or an integer multiple of a pixel pitch), it is necessary to enlarge the area occupied by the PGA in a column-wise direction perpendicular to the pixel pitch. The conventional configuration thus has a disadvantage such that an attempt to obtain a high gain of a PGA inevitably involves increase in circuit area thereof.

SUMMARY OF THE INVENTION

According to one aspect of the present invention, an image capturing device includes a pixel circuit, a programmable-gain amplifier, an analog-to-digital conversion circuit, and a control circuit. The pixel circuit outputs a photoreception signal. The programmable-gain amplifier amplifies the photoreception signal with a first gain. The analog-to-digital conversion circuit further amplifies the amplified signal that has been amplified by the programmable-gain amplifier, with a second gain by having a circuit configuration changeable by control, and digitally converts the resultant signal. The control circuit controls the analog-to-digital conversion circuit.

BRIEF DESCRIPTION OF THE DRAWINGS

FIG. 12 is a diagram illustrating an example of changes in output voltage Vout corresponding to respective operation phases when the ADC operates as illustrated in FIG. 11.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
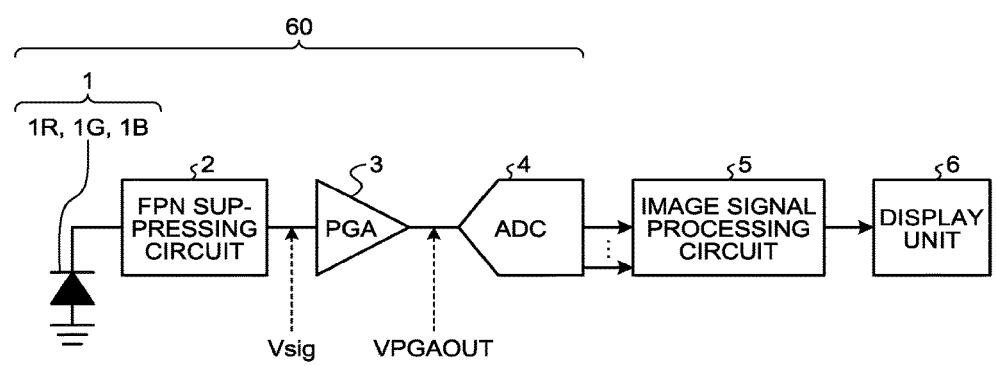
FIG. 1 is a block diagram illustrating an example of the configuration of an electronic device including an image capturing device according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an image capturing device capable of reducing a gain assigned to a PGA and thereby reducing the circuit area thereof.

An embodiment of the present invention will be described in detail below with reference to the drawings. The same reference signs indicate the same components throughout the drawings.

FIG. 1 is a block diagram illustrating an example of the configuration of an electronic device including an image capturing device according to an embodiment of the present invention. The electronic device illustrated in FIG. 1 is, for example, a multifunction peripheral, a facsimile apparatus, or an image scanner apparatus.

As illustrated in FIG. 1, the electronic device according to this embodiment includes an image capturing device 60, an image signal processing circuit 5, and a display unit 6. The image capturing device 60 includes: a pixel circuit 1 including photodiodes 1R, 1G, and 1B; a fixed pattern noise (FPN) suppressing circuit 2; a programmable-gain amplifier (PGA) 3; and an analog-to-digital converter (ADC) 4.

In FIG. 1, the pixel circuit 1 includes the photodiodes 1R, 1G, and 1B that receive light of respective three colors of red (R), green (G), and blue (B), and converts an electric charge signal proportional to the quantity (light quantity) of light received by the photodiodes 1R, 1G, and 1B into a voltage through a pixel amplifier (not illustrated) to output the voltage to the FPN suppressing circuit 2. In this specification, each signal, converted based on the electric charge signal, to be input to the PGA 3 corresponds to "a photoreception signal".

The FPN suppressing circuit 2 is configured by, for example, a sample/hold circuit, and removes, from each signal voltage output from the photodiodes 1R, 1G, and 1B of the pixel circuit 1, a noise component due to manufacturing tolerance in transistors.

The PGA 3 amplifies the signal voltage (Vsig) output from the FPN suppressing circuit 2 with a certain gain (a first gain), and then outputs the thus-amplified signal voltage to the ADC 4.

The ADC 4 converts the signal voltage (an analog amplification signal) VPGAOUT output from the PGA 3 into digital data, and then outputs the digital data to the image signal processing circuit 5.

The image signal processing circuit 5 includes a control circuit 50 (refer to FIG. 4) that controls timings for operation of the image capturing device 60. The image signal processing circuit 5 includes an image signal processing unit that receives digital data from the image capturing device 60 and then performs predetermined image signal processing such as edge enhancing processing, binarization processing, or dither processing, and displays an image obtained through the image signal processing, for example, on a display unit 6.

In this embodiment, an exemplary method is described in which a gain (a second gain) is obtained in the ADC 4 with a cyclic ADC used as the ADC 4.

Figure 2:
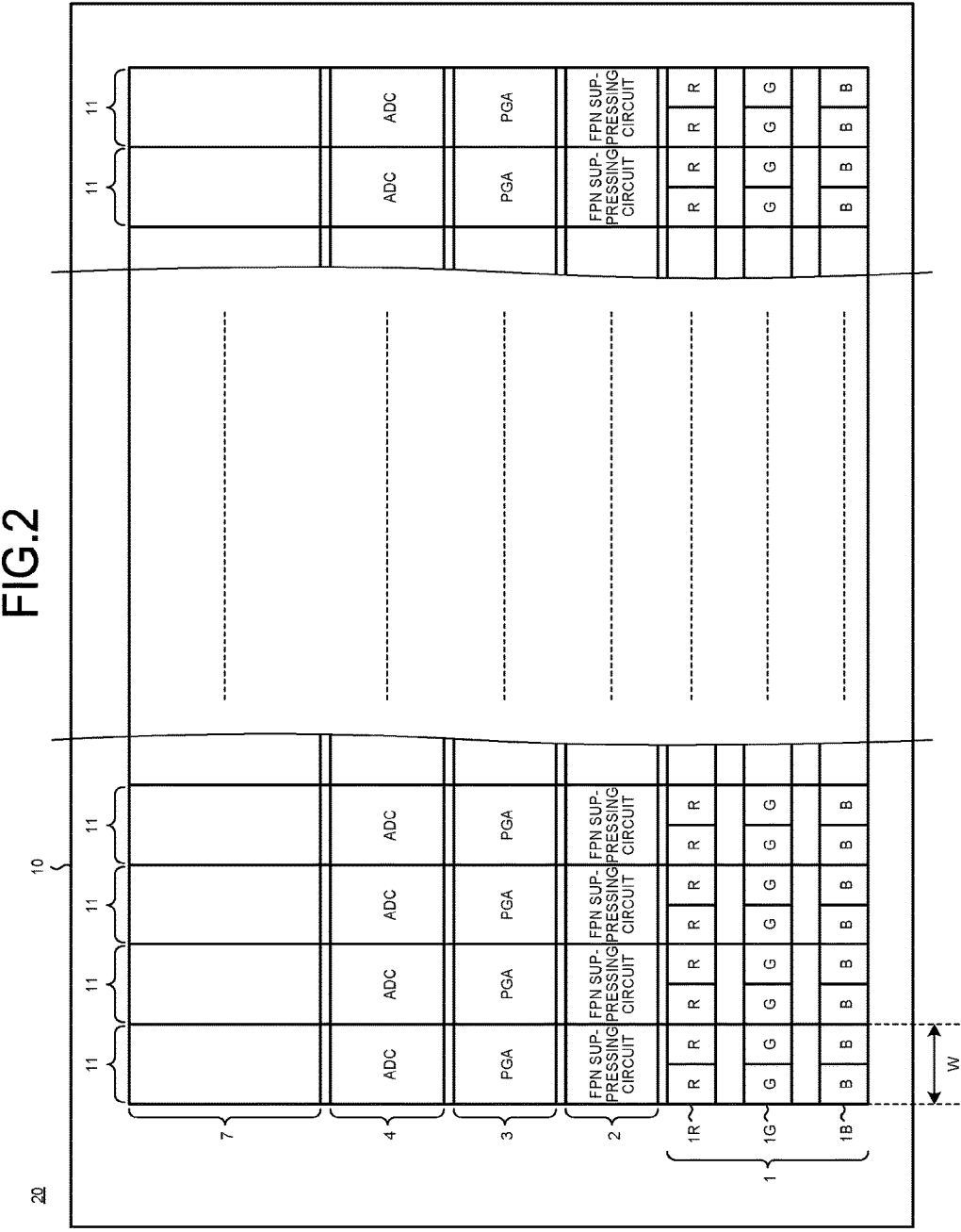
FIG. 2 is a diagram illustrating an example of the layout of blocks included in the image capturing device illustrated in FIG. 1, in a CMOS line sensor.

FIG. 2 is a diagram illustrating an example of the layout of blocks included in the image capturing device 60 illustrated in FIG. 1, in a CMOS line sensor. The CMOS line sensor is an example of the image capturing device 60. On a substrate 10 of the CMOS line sensor 20 illustrated in FIG. 2, two column-wise lines each composed of the photodiode 1R, the photodiode 1G, and the photodiode 1B are arranged in parallel to each other, and each of the blocks such as the PGA 3 and the ADC 4 is arranged in such a manner as to correspond to the width (twice as wide as the pixel pitch) W of the two lines. The signal processing circuit 7 is a circuit that includes the control circuit 50 (refer to FIG. 4) and the like.

In an example illustrated in FIG. 2, a unit of two sets of the photodiodes 1R, 1G, and 1B is arranged with the PGA 3 and the ADC 4; however, the number of pixels arranged with the PGA 3 and the ADC 4 can be designed optionally. In addition, one chip configured for digital output that has the ADC 4 and the signal processing circuit 7 on-board integrated is employed here, the ADC 4 and the signal processing circuit 7 may be off-board. In such a case, the image capturing device 60 is constructed as a device including sets each including: a chip configured for analog output; the ADC 4; and the signal processing circuit 7.

As illustrated in FIG. 2, the PGA 3 and the ADC 4 are provided in such a manner as to fit in a narrow width (the width W) of several micrometers, which is twice as wide as the pixel pitch in this example. In order to obtain a larger gain at the PGA 3, the circuit area of the PGA 3 needs to be larger, which means that an area occupied by the PGA 3 needs to be enlarged in a longitudinal direction of a column 11. This increases the circuit area, and increases the size of the chip. In this embodiment, a portion (the second gain) of the gain that is otherwise assigned to the PGA 3 is assigned to the ADC 4 so that the circuit area of the PGA 3 can be as small as possible. The specific configurations of the PGA 3 and the ADC 4 according to this embodiment are described hereinbelow.

Figure 3:
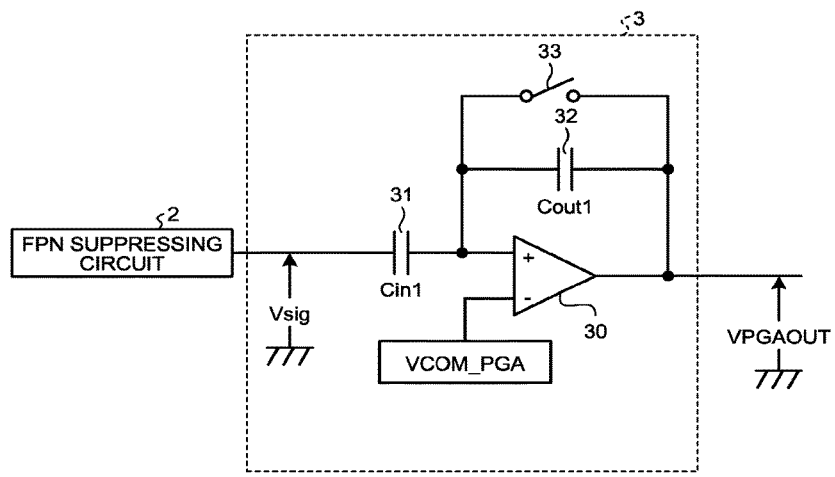
FIG. 3 is a diagram illustrating an example of a circuit for a PGA.

FIG. 3 is a diagram illustrating an example of a circuit for the PGA 3 (refer to FIG. 2). In FIG. 3, the PGA 3 is a capacitive-coupling type PGA provided with an offset correction function, and is composed of an operational amplifier 30, a capacitor 31, a capacitor 32, and a switch 33. Here, the capacitor 31 is an input-side capacitor having a capacitance of Cin1. The capacitor 32 having a capacitance of Cout1 is a feedback capacitor that connects the output terminal and the non-inverting input terminal of the operational amplifier 30 to each other. The switch 33 is connected in parallel to the capacitor 32 and functions to reset an electric charge stored in the capacitor 32. The switch 33 is constructed of, for example, an MOS transistor. "VCOM_PGA" indicates a reference voltage generated by a predetermined voltage generating circuit, and is applied to the inverting input terminal of the operational amplifier 30. The PGA 3 amplifies the signal voltage Vsig output from the FPN suppressing circuit 2 with a preset gain (the first gain) and outputs the thus-amplified signal voltage VPGAOUT.

The gain of the PGA 3 having such configuration is determined based on a capacitance ratio, Cout1/Cin1. When the switch 33 is switched on before the amplification of the signal voltage Vsig, the output voltage VPGAOUT is offset so as to be the reference voltage VCOM_PGA. Consequently, the output voltage VPGAOUT is a voltage obtained by multiplying the signal voltage Vsig from the FPN suppressing circuit 2 by Cout1/Cin1 with the reference voltage VCOM_PGA used as a reference. The PGA 3 can be thus constructed of circuit components the respective areas of which can be kept small. When a higher gain is needed, the gain (the first gain) obtained at the PGA 3 incurs a deficiency, so that the ADC 4 described next is used to obtain a gain (the second gain) corresponding to the deficiency.

Figure 4:
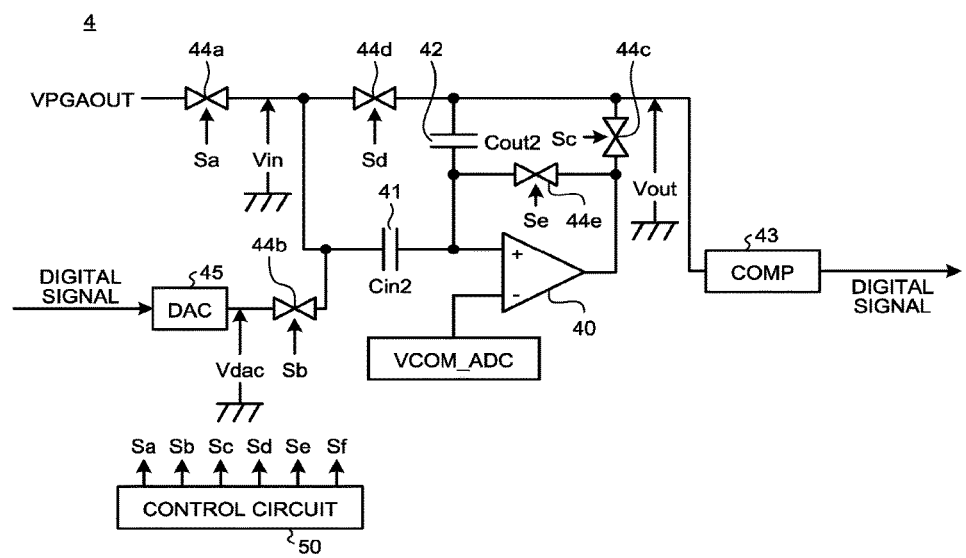
FIG. 4 is a diagram illustrating an example of a circuit for a cyclic ADC.

FIG. 4 is a diagram illustrating an example of a circuit for a cyclic ADC given as an example of the ADC 4 (refer to FIG. 2). In FIG. 4, the ADC 4 includes an operational amplifier 40, capacitors 41 and 42, a comparator 43, switches 44a to 44e, a digital-to-analog converter (DAC) 45, and a control circuit 50.

The capacitor 41 is an input-side capacitor, and has a capacitance of Cin2. The capacitor 42 is a feedback capacitor, and has a capacitance of Cout2. The switches 44a to 44e are constructed of, for example, MOS transistors. The switches 44a to 44e are switched on and off based on control signals Sa to Se from the control circuit 50, respectively. The control circuit 50 outputs the control signals Sa to Se to the switches 44a to 44e, respectively, thereby switching the switches 44a to 44e to switch between operation phases of the ADC 4. The control circuit 50 further outputs a control signal Sf to the DAC 45, thereby setting a constant voltage for the DAC 45.

The output voltage VPGAOUT from the PGA 3 is input to the non-inverting input terminal of the operational amplifier 40 via the switch 44a and the capacitor Cin2. The DAC 45 performs digital-to-analog (DA) conversion on a digital signal from the comparator 43 into an analog signal, and the output voltage Vdac (analog signal voltage) corresponding to the analog signal is input to the non-inverting input terminal of the operational amplifier 40 via the switch 44b and the capacitor 41. A certain reference voltage VCOM_ADC is applied to the inverting input terminal of the operational amplifier 40. The output terminal of the operational amplifier 40 is connected to the non-inverting input terminal via the switch 44e. In parallel, the output terminal of the operational amplifier 40 is connected to the non-inverting input terminal via the switch 44c and the capacitor 42. The connection point between the switch 44a and the capacitor 41 is connected via the switch 44d to the connection point between the capacitor 42 and the switch 44c. The comparator 43 is connected to the connection point among the switch 44c, the switch 44d, and the capacitor 42.

The operational amplifier 40 subtracts the reference voltage VCOM_ADC from a signal voltage input to the non-inverting input terminal, amplifies a voltage obtained as a result of the subtraction, and outputs the amplified voltage. The comparator 43 compares a signal voltage input thereto with a predetermined threshold and outputs a digital signal. The digital signal output from the comparator 43 is fed back in a looped manner to the DAC 45. The digital signal output from the comparator 43 is input to a logic circuit in the signal processing circuit 7 (refer to FIG. 2), and then is formed into a bit string corresponding to the converted output voltage VPGAOUT. The DAC 45 converts the digital signal fed back from the comparator 43 into an analog signal (the analog signal voltage Vdac).

Next, operation of the ADC 4 is described. First, with reference to FIG. 5A to FIG. 9, operation phases in analog-to-digital (AD) conversion is described in which a reset phase T1, a data input phase T2, a hold phase T3, and a sample phase T4 are cyclically performed. After these operation phases are described, operation phases in an amplifier mode for obtaining a gain (the second gain) in the ADC 4 are described with reference to FIG. 10A to FIG. 12. Hereinafter, it is assumed that the respective switches 44a to 44e are switched on and off when the control circuit 50 outputs the control signals Sa to Se to the switches 44a to 44e, respectively.

Figure 5A:
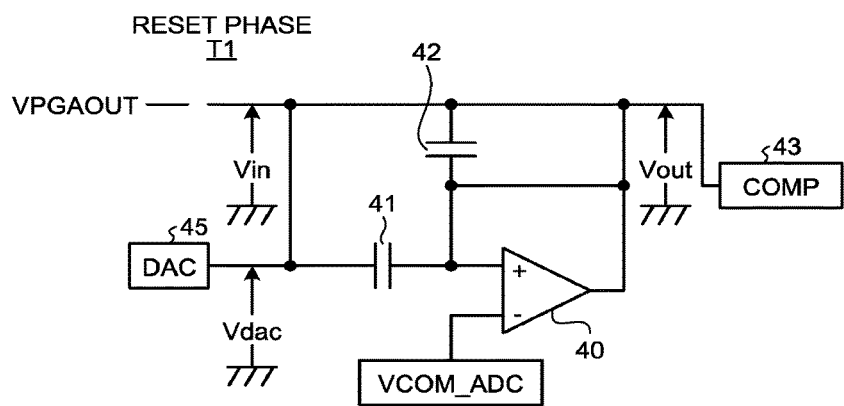
FIG. 5A is a circuit diagram illustrating the connection status of an ADC in a reset phase.
Figure 5B:
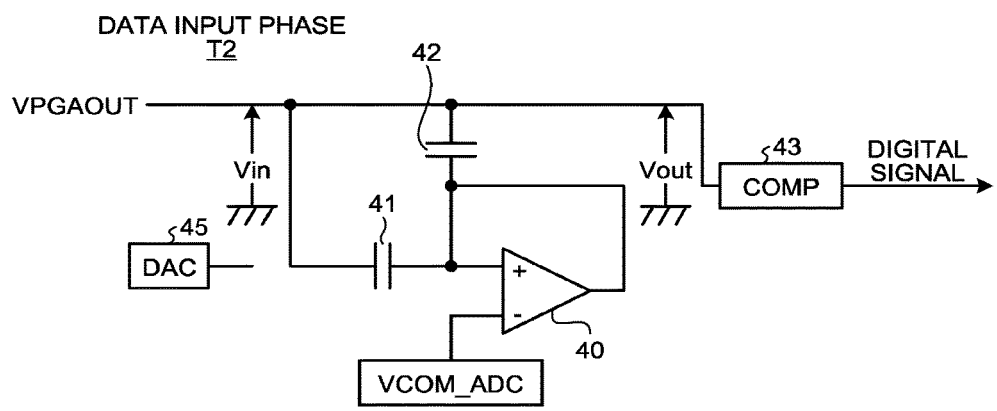
FIG. 5B is a circuit diagram illustrating the connection status of the ADC in a data input phase.
Figure 5C:
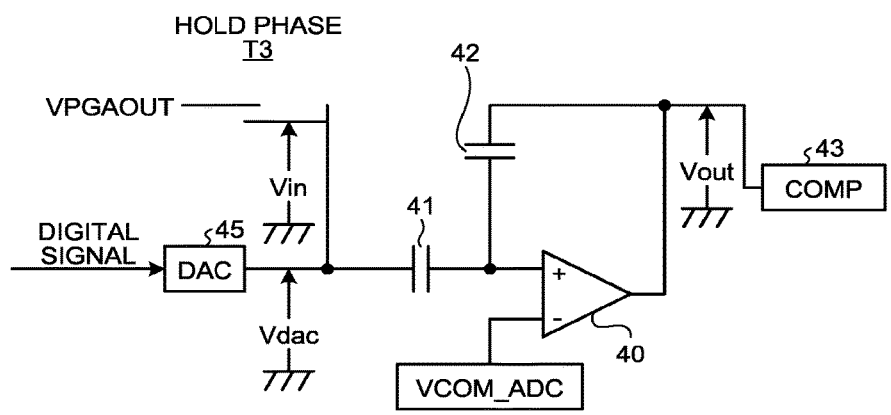
FIG. 5C is a circuit diagram illustrating the connection status of the ADC in a hold phase.
Figure 5D:
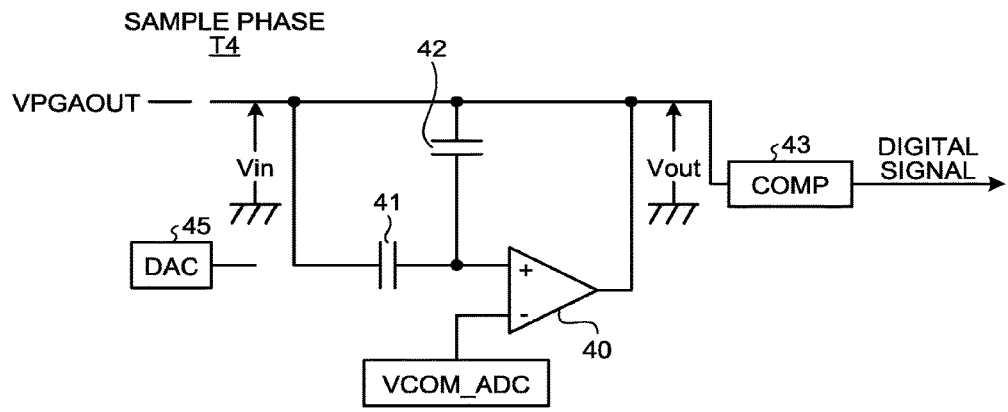
FIG. 5D is a circuit diagram illustrating the connection status of the ADC in a sample phase.

FIG. 5A is a circuit diagram illustrating the connection status of the ADC 4 in the reset phase T1. FIG. 5B is a circuit diagram illustrating the connection status of the ADC 4 in the data input phase T2. FIG. 5C is a circuit diagram illustrating the connection status of the ADC 4 in the hold phase T3. FIG. 5D is a circuit diagram illustrating the connection status of the ADC 4 in the sample phase T4.

(1) During the reset phase T1 (refer to FIG. 5A), the ADC 4 illustrated in FIG. 4 has the switches 44b, 44c, 44d, and 44e switched on and the switch 44a switched off. Consequently, output from the operational amplifier 40 is offset to the reference voltage VCOM_ADC.

(2) During the data input phase T2 (refer to FIG. 5B), the ADC 4 has the switches 44a, 44c, and 44d switched on and the switches 44b and 44e switched off. In this state, the signal voltage VPGAOUT is input as the input voltage Vin. Consequently, analog values of the signal voltage are sampled, and the comparator 43 compares the sampled output voltages Vout with a predetermined threshold (a reference voltage corresponding to the full scale of the ADC 4) and outputs a digital signal. This digital signal is output to the logic circuit and constitutes the most significant bit (MSB) in the bit string.

(3) During the hold phase T3 (refer to FIG. 5C), the switches 44b and 44c are switched on and the switches 44a, 44d, and 44e are switched off. Consequently, the output voltage Vdac of the DAC 45, which corresponds to a digital signal fed back from comparator 43, is applied to (or connected and input to) an electrode of the capacitor 41. In this state, the operational amplifier 40 amplifies a voltage corresponding to the difference between the input voltage Vin and the output voltage Vdac of the DAC 45 with an amplification factor determined in accordance with the capacitor 41 and the capacitor 42, and outputs the resultant output voltage Vout to the comparator 43.

When Vout(i+1) denotes the output voltage Vout in this phase and Vout(i) denotes the output voltage Vout in the phase immediately preceding this phase, the following relation (1) holds.

$$\begin{aligned} Vout(i+1) &= Vout(i) + (Cout2/Cin2)(Vout(i) - Vdac) \\ &= (1 + (Cout2/Cin2))Vout(i) - Cout2/Cin2)Vdac \end{aligned} \quad (1)$$

Additionally, the capacitances Cin2 and Cout2 of the capacitors 41 and 42 are set equal, so that Equation (2) below is obtained.

$$Vout(i+1) = 2 \times Vout(i) - Vdac \quad (2)$$

That is, through the hold phase T3, the output voltage Vout is found in such a manner that: the immediately preceding voltage is amplified twofold; and a predicted value Vdac predicted by the comparator 43 is then subtracted from the thus amplified voltage.

(4) During the sample phase T4 (refer to FIG. 5D), the switches 44c and 44d are switched on and the switches 44a, 44b, and 44e are switched off. Consequently, the comparator 43 compares the output voltages Vout(i+1) with a predetermined threshold (a reference voltage corresponding to the full scale of the ADC 4) and outputs a digital signal. This digital signal is output to the logic circuit and forms lower bits following the MSB.

Figure 6:
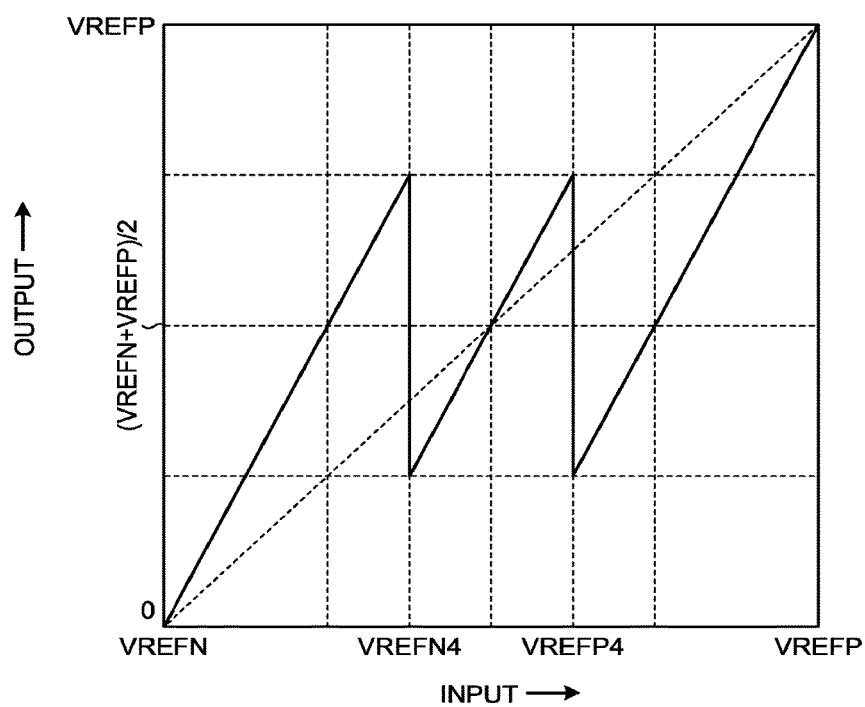
FIG. 6 is a diagram illustrating an example of the input-output characteristic of a comparator in AD conversion using a redundant configuration of 1.5 bits per cycle.

FIG. 6 is a diagram illustrating an example of the input-output characteristic of the comparator 43 in AD conversion with a redundant configuration of 1.5 bits per cycle.

The range of the input voltages to the ADC 4 is between VREFN and VREFP as illustrated in FIG. 6. The output voltage VPGAOUT of the PGA 3 is output with the reference voltage VCOM_PGA used as a reference. For this reason, when there is a difference between the reference voltage VREFP in the input voltage range of the ADC 4 and the reference voltage VCOM_PGA of the PGA 3, the difference inevitably serves as an offset. Therefore, it is ideal if the voltages VREFP and VCOM_PGA have the same value, and it is preferable that the voltages VREFP and VCOM_PGA be set to the same value.

When voltages within this input voltage range are set to VREFN4 and VREFP4, VREFN4 and VREFP4 are expressed by Equations (3) and (4) below without fluctuations taken into consideration.

$$VREFN4 = (3/8) \times (VREFP - VREFN) \tag{3}$$

$$VREFP4 = (5/8) \times (VREFP - VREFN) \tag{4}$$

In the 1.5-bit redundant configuration, the comparator (refer to FIG. 5A to FIG. 5D) uses two comparators to determine which of three values ("−1", "0", and "1") of a digital signal an input voltage corresponds to, and outputs a digital code having a 2-bit width (any one of "00", "01", and "10" respectively corresponding to the three values) as a result of the determination. Specifically, if the input voltage is between the voltages VREFN and VREFN4, the comparator 43 determines that the input voltage corresponds to "−1". If the input voltage is between the voltages VREFN4 and VREFP4, the comparator 43 determines that the input voltage corresponds to "0". Furthermore, if the input voltage is between the voltages VREFP4 and VREFP, the comparator 43 determines that the input voltage corresponds to "1". A signal obtained by encoding the digital signal is fed back from the comparator 43 to the DAC 45.

If the digital signal input to the DAC 45 indicates "−1", the DAC 45 outputs a signal for a voltage of VREFN. If the digital signal input to the DAC 45 indicates "0", the DAC 45 outputs a signal for a voltage of (VREFN+VREFP)/2. If the digital signal input to the DAC 45 indicates "1", the DAC 45 outputs a signal for a voltage of VREFP.

Described next is the input-output status of the ADC 4 in each phase when the ADC 4 repeats a cycle of the hold phase T3 and the sample phase T4 a plurality of times after the data input phase T2.

Figure 7:
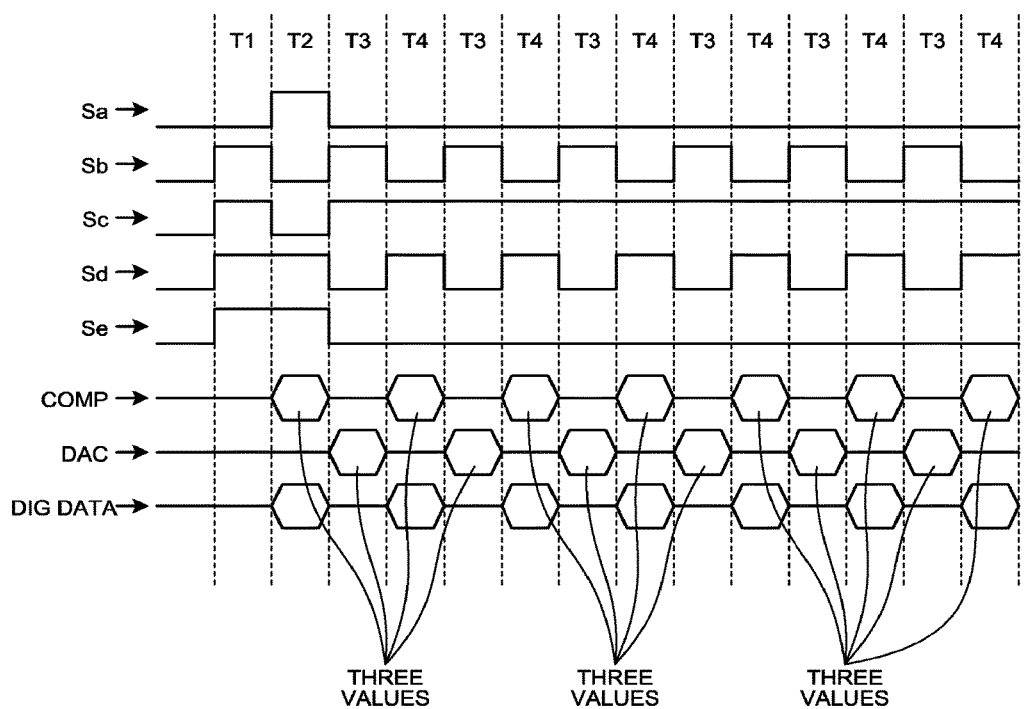
FIG. 7 is a diagram illustrating an example of control timing and input-output status of the ADC.
Figure 8:
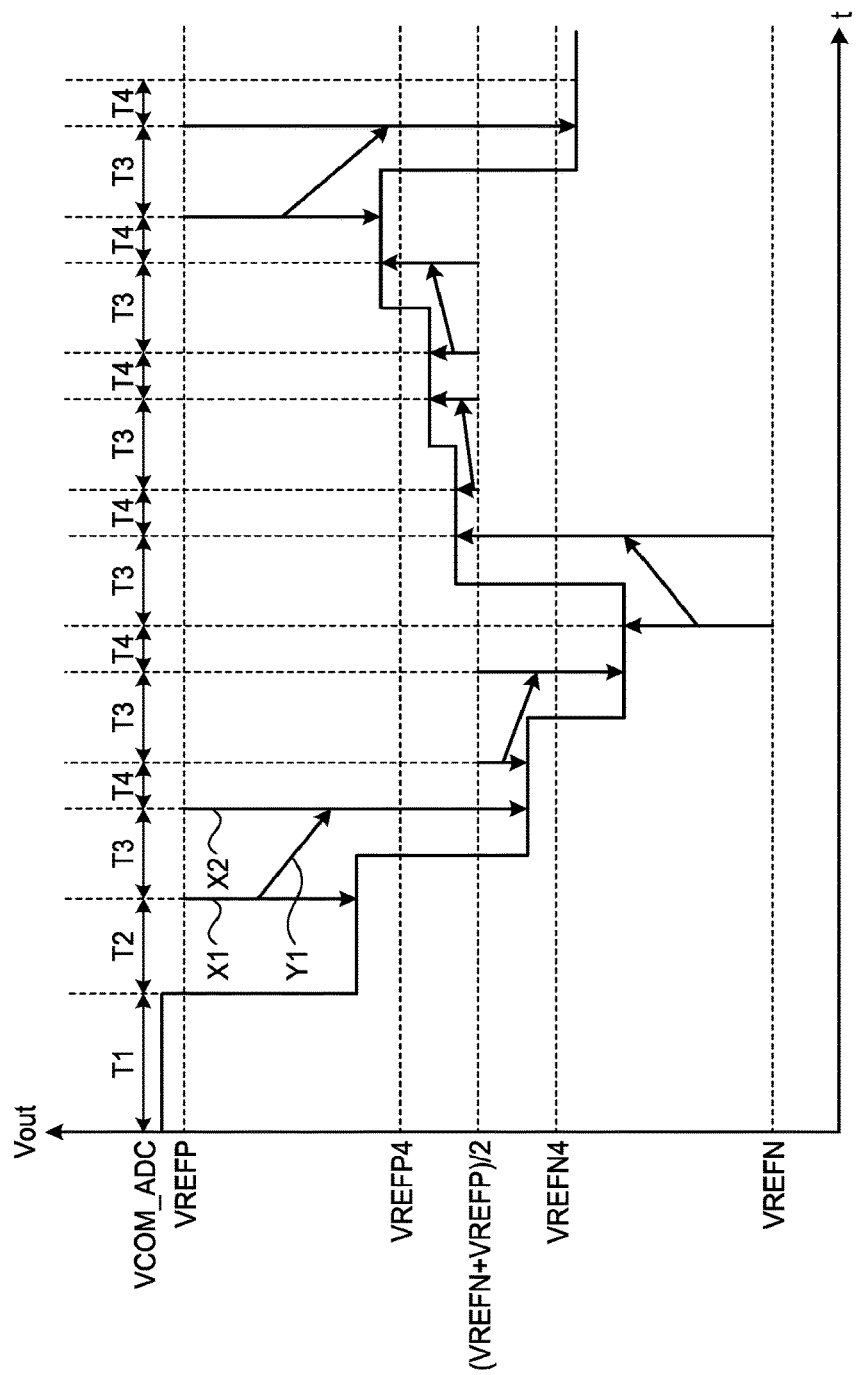
FIG. 8 is a diagram illustrating an example of changes in output voltage corresponding to respective operation phases when the ADC operates as illustrated in FIG. 7.

FIG. 7 is a diagram illustrating an example of control timing and input-output status of the ADC 4. FIG. 8 is a diagram illustrating an example of changes in the output voltage Vout. FIG. 7 and FIG. 8 illustrate the operation starting from the reset phase T1 followed by the data input phase T2 further followed by six cycles of each composed of the hold phase T3 and the sample phase T4.

The control signals Sa, Sb, . . . , and Se in FIG. 7 indicate the input timing of a pulse for turning on and off the switches 44a, 44b, . . . , and 44e, respectively. The rise of a pulse turns on a corresponding switch and the fall of a pulse turns off a corresponding switch.

"COMP" in FIG. 7 indicates the output signal waveform of the comparator 43. The comparator 43 outputs a digital signal indicating any one of the three values ("−1", "0", and "1") at the timing of the data input phase T2 and each of the sample phases T4.

"DAC" in FIG. 7 indicates the output signal waveform of the DAC 45. The DAC 45 outputs an analog signal (analog voltage) indicating any one of the three values (VREFN, (VREFN+VREFP)/2, VREFP) at the timing of the hold phase T3.

"DIG data" in FIG. 7 indicates the waveform of the bit string corresponding to the converted output voltage VPGAOUT. As already described in connection with Equation (2), in the hold phase T3, the output voltage Vout is amplified twofold. Therefore, each time the cycle of the hold phase T3 and the sample phase T4 is performed again, Equation (2) holds. The bit string obtained after repeating the cycle a larger number of times is expressed with higher resolution, and more closely approximates the output voltage VPGAOUT.

In the 1.5-bit redundant configuration of this example, a bit string corresponding to the (N+1)-bit resolution is generated when operation of the hold phase T3 and the sample phase T4 is repeated N times.

As illustrated in FIG. 8 as an example, in the data input phase T2, a voltage value based on the signal voltage VPGAOUT from the PGA 3 appears on the output voltage Vout. At the following hold phase T3, the output voltage Vout is doubled with the output voltage Vdac of the DAC 45 used as a reference and held at the resultant voltage. At the following sample phase T4, the output voltage Vout is kept at the voltage that has been held through the hold phase T3, and in this phase, the comparator 43 outputs a digital signal. After that, the hold phase T3 and the sample phase T4 are repeated cyclically and the output voltage Vout changes as illustrated in FIG. 8.

In an example illustrated in FIG. 8, the output voltage Vout is between the voltages VREFP4 and VREFP before switching to the first hold phase T3. Thus, in this hold phase T3, the output voltage Vout is doubled with the voltage VREFP used as a reference. FIG. 8 illustrates the directions and sizes of the output voltage Vout from the reference voltage before and after the output voltage is doubled, with the arrow X1 and the arrow X2 indicating those before and after it is doubled, respectively. The arrow Y indicates a pair of the output voltage Vout before and after it is doubled.

At the second hold phase T3, the output voltage Vout is between the voltages VREFN4 and VREFP4 before switching to this hold phase T3. Thus, in this hold phase T3, the output voltage Vout is doubled with the voltage (VREFN+VREFP)/2 used as a reference. At the third hold phase T3, the output voltage Vout is between the voltages VREFN and VREFN4 before switching to this hold phase T3. Thus, in this hold phase T3, the output voltage Vout is doubled with the voltage VREFP used as a reference. The same applies to the fourth and following hold phases T, and description thereof is therefore omitted.

Figure 9:
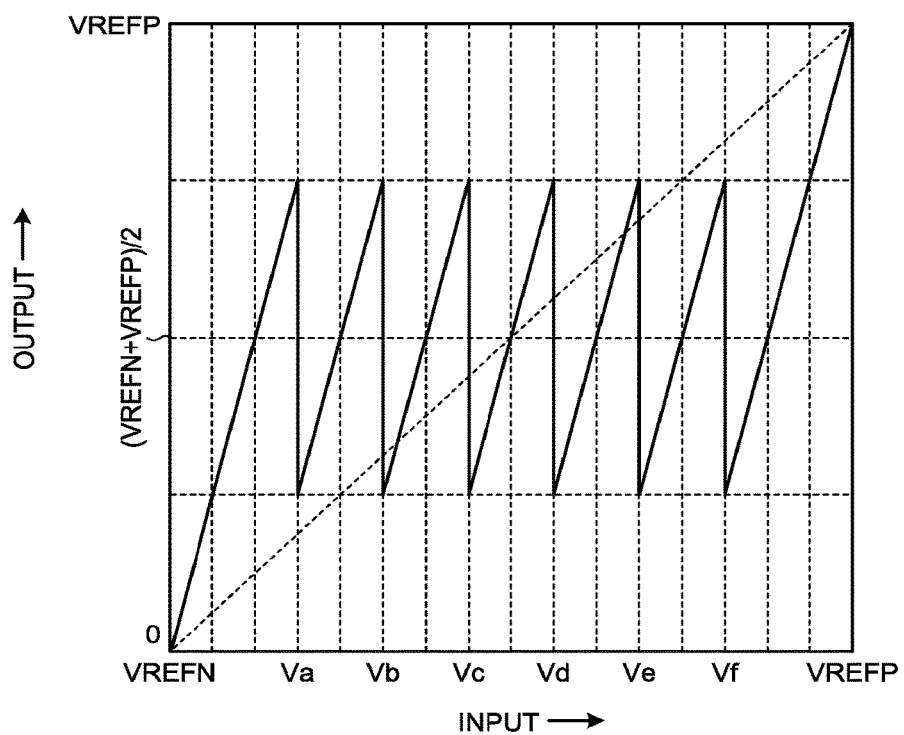
FIG. 9 is a diagram illustrating an example of the input-output characteristic of the comparator in AD conversion using a redundant configuration of 2.5 bits per cycle.

FIG. 9 is a diagram illustrating an example of the input-output characteristic of the comparator 43 in AD conversion with a redundant configuration of 2.5 bits per cycle. The number of bits per cycle is changed from 1.5 bits to 2.5 bits, so that the number of cycles can be decreased relative to the increase in number of bits per cycle. In addition, a processing time for the AD conversion can be reduced. Here, Equation (5) below is obtained when Cout2/Cin2=3.

$$Vout(i+1) = 4 \times Vout(i) - 3 \times Vdac \tag{5}$$

The output voltage Vout can be amplified fourfold.

Here, the range of the voltage VREFN to the voltage VREFP is divided by Va to Vf as illustrated in FIG. 9. The voltages Va to Vf are expressed by Equations (6) to (11), respectively, without fluctuations taken into consideration.

$$Va = (3/16) \times (VREFP - VREFN) \tag{6}$$

$$Vb = (5/16) \times (VREFP - VREFN) \tag{7}$$

$$Vc = (7/16) \times (VREFP - VREFN) \tag{8}$$

$$Vd = (9/16) \times (VREFP - VREFN) \tag{9}$$

$$Ve = (11/16) \times (VREFP - VREFN) \tag{10}$$

$$Vf = (13/16) \times (VREFP - VREFN) \tag{11}$$

The bit output system is switched between 1.5-bit output system and 2.5-bit output system based on the setting of determination criteria of the comparator 43 (for example, Va, Vb, Vc, Vd, Ve, Vf).

Next, operation that includes an amplification mode in the ADC 4 is described. In this embodiment, operation in the amplification mode composed of a signal amplification phase T21 and an amplified-signal input phase T22 is performed between the data input phase T2 and the hold phase T3 in AD-conversion operation in which the reset phase T1, the data input phase T2, the hold phase T3, and the sample phase T4 are cyclically performed. The operation in the amplification mode is such that signal amplification is performed on a signal voltage output from the PGA 3 before AD conversion is performed thereon. This operation makes it possible to assign a gain (the second gain) to the ADC 4. In addition, each of the operation phases cyclically functions, so that the resolution can be maintained. The sequence of operation of the ADC 4 is as described below.

Figure 10A:
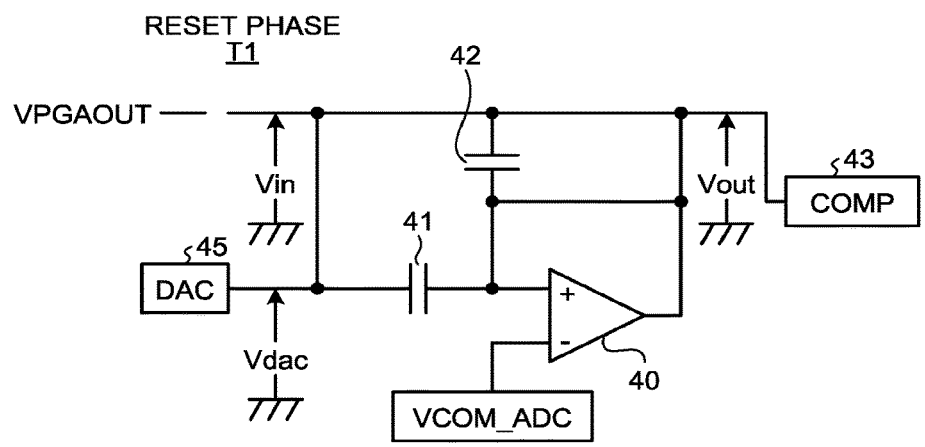
FIG. 10A is a circuit diagram illustrating the connection status of an ADC in a reset phase.
Figure 10B:
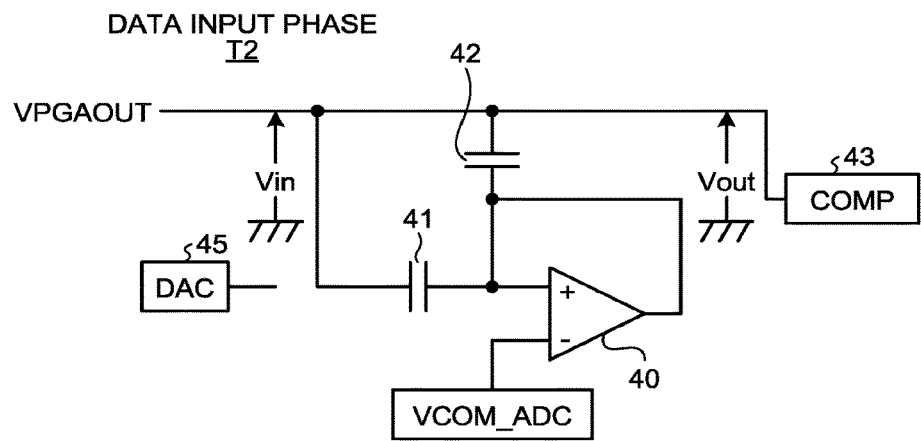
FIG. 10B is a circuit diagram illustrating the connection status of the ADC in a data input phase.
Figure 10C:
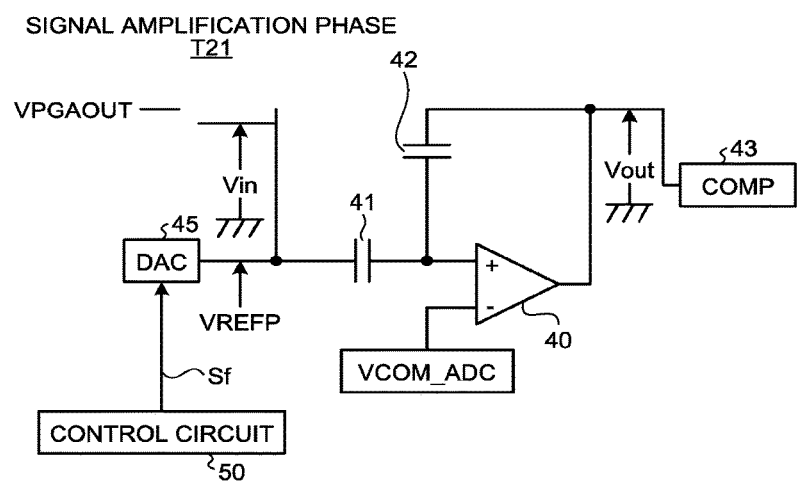
FIG. 10C is a circuit diagram illustrating the connection status of the ADC in a signal amplification phase.
Figure 10D:
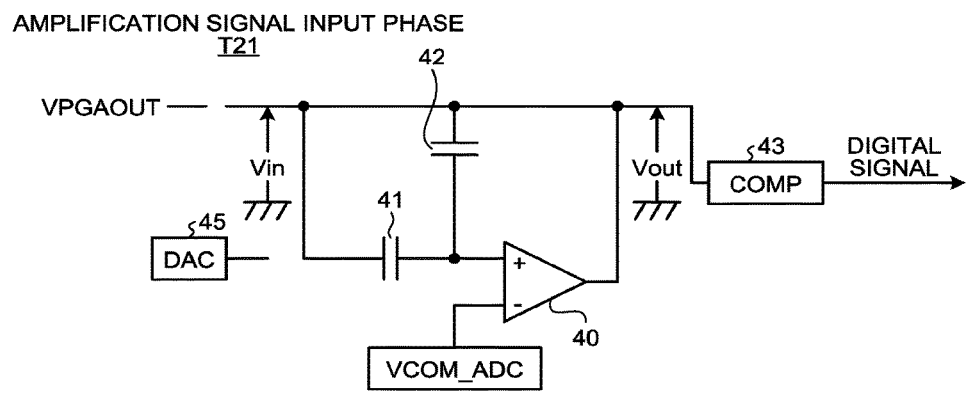
FIG. 10D is a circuit diagram illustrating the connection status of the ADC in an amplified-signal input phase.
Figure 10E:
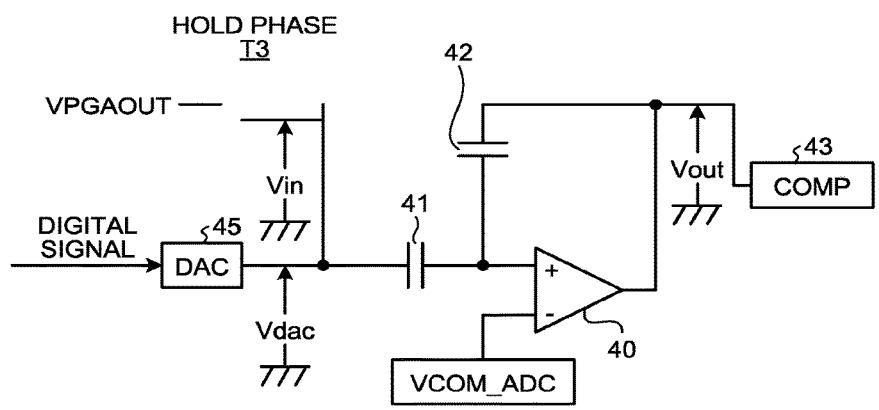
FIG. 10E is a circuit diagram illustrating the connection status of the ADC in a hold phase.
Figure 10F:
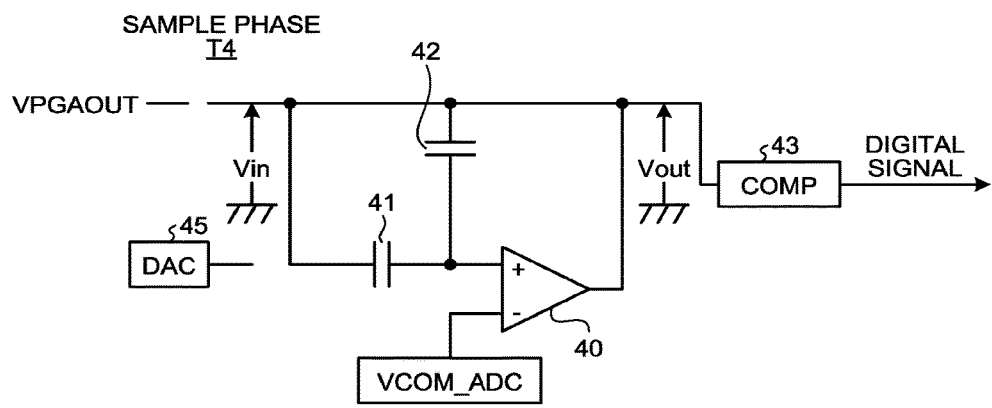
FIG. 10F is a circuit diagram illustrating the connection status of the ADC in a sample phase T4.

FIG. 10A is a circuit diagram illustrating the connection status of the ADC 4 in the reset phase T1. FIG. 10B is a circuit diagram illustrating the connection status of the ADC 4 in the data input phase T2. FIG. 10C is a circuit diagram illustrating the connection status of the ADC 4 in the signal amplification phase T21. FIG. 10D is a circuit diagram illustrating the connection status of the ADC 4 in the amplified-signal input phase T22. FIG. 10E is a circuit diagram illustrating the connection status of the ADC 4 in the hold phase T3. FIG. 10F is a circuit diagram illustrating the connection status of the ADC 4 in the sample phase T4.

The sequence of operation of the ADC 4 in this case is as follows.

(1) The reset phase T1 (refer to FIG. 10A) is the same as the one in FIG. 5A, and description thereof is omitted here to avoid repeated description.

(2) The data input phase T2 (refer to FIG. 10B) is different from the one in FIG. 5B in that: the digital signal output from the comparator 43 is not used in a bit string corresponding to the converted output voltage VPGAOUT (as the MSB).

(3) At the signal amplification phase T21 (refer to FIG. 10C), while the switches 44b and 44c in FIG. 4 are switched on, the switches 44a, 44d, and 44e are switched off. Furthermore, the output voltage Vdac of the DAC 45 is fixed at the reference voltage VREFP. Consequently, the reference voltage VREFP is applied to (or connected and input to) an electrode of the capacitor 41 from the DAC 45. In this state, the output voltage Vout is doubled with the voltage VREFP of the DAC 45 used as a reference, and a gain (the second gain) is obtained.

(4) The amplified-signal input phase T22 (refer to FIG. 10D) is substantially the same as the phase in FIG. 5D. In this case, the comparator 43 compares a voltage value double the output voltage Vout of a phase before switching to the amplified-signal input phase T22 with a predetermined threshold (a reference voltage corresponding to the full scale of the ADC 4) and outputs a digital signal. This digital signal is output to the logic circuit and constitutes the MSB in the bit string.

(5) In the hold phase T3 (refer to FIG. 10E), the ADC 4 operates in the same manner as in FIG. 5C.

(6) In the sample phase T4 (refer to FIG. 10F), the ADC 4 operates in the same manner as in FIG. 5D.

Figure 11:
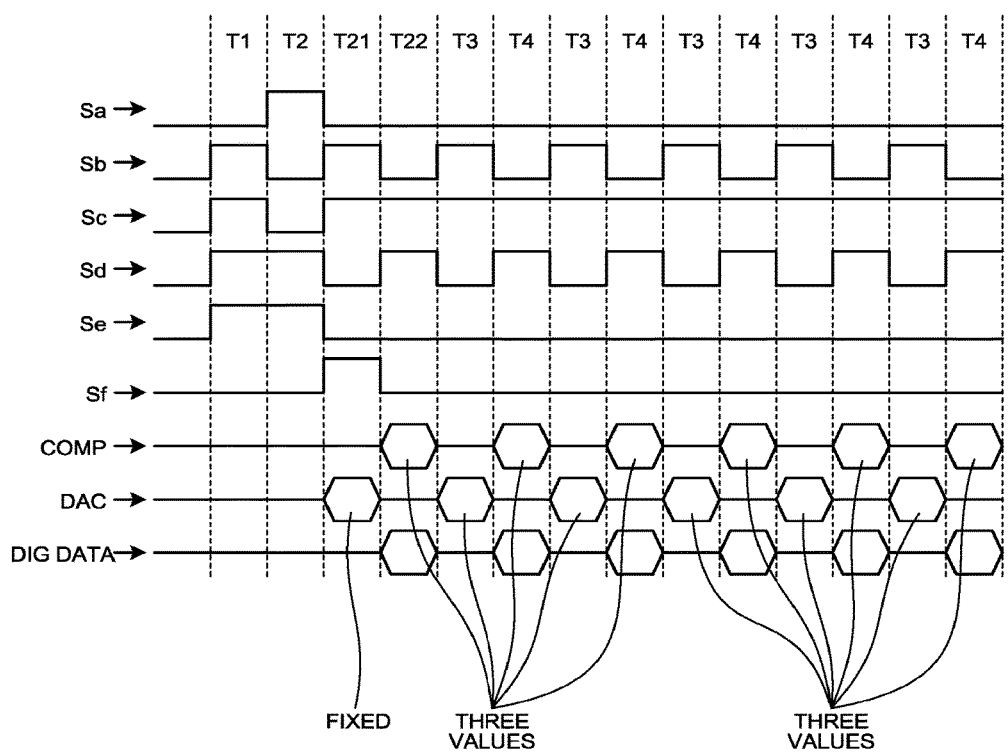
FIG. 11 is a diagram illustrating an example of control timing and input-output status of an ADC that includes an amplification mode.

FIG. 11 is a diagram illustrating an example of control timing and input-output status of the ADC 4 that includes the amplification mode. FIG. 12 is a diagram illustrating an example of changes in the output voltage Vout. In contrast to FIG. 7 and FIG. 8, each of FIG. 11 and FIG. 12 includes the amplification mode, which is indicated by the signal amplification phase T21 and the amplified-signal input phase T22, after the data input phase T2. FIG. 11 and FIG. 12 further include the input timing of the pulse of the control signal Sf.

As the control signal Sf in FIG. 11 illustrates, during the signal amplification phase T21, the control circuit 50 inputs a pulse to the DAC 45 to fix the output voltage Vdac of the DAC 45 at the reference voltage VREFP. With the fixation, a signal is amplified, that is, a gain (the second gain) is obtained, and at the following amplified-signal input phase T22, the MSB is output as a part of the bit string of DIG data. At the phases other than the signal amplification phase T21, the control circuit 50 stops inputting the pulse to the DAC 45, and thus the DAC 45 operates to switch the output voltage Vdac in accordance with the feedback signal from the comparator 43.

FIG. 12 illustrates an example of the change of the output voltage Vout in which the signal voltage VPGAOUT input from the PGA 3 has a level that halves a signal voltage with respect to the voltage VREFP as depicted in the data input phase T2 as illustrated in FIG. 8. In other words, the example illustrates a case where a gain at the PGA 3 is reduced.

As illustrated in FIG. 12, in the data input phase T2, the voltage value based on the halved signal voltage VPGAOUT from the PGA 3 appears on the output voltage Vout. At the following signal amplification phase T21, the output voltage Vout is doubled with the output voltage Vdac (here, fixed to VREFP) of the DAC 45 used as a reference and held at the resultant voltage. That is, the halved signal voltage VPGAOUT is amplified by twice and, at the following amplified-signal input phase T22, similar to the data input phase T2 illustrated in FIG. 8, the MSB of the bit string is generated. The change of the output voltage Vout based on the operation in the following hold phases T3 and the sample phases T4 is the same as that in FIG. 8.

Thus, inclusion of the amplification mode allows the ADC 4 to regain the gain corresponding to the reduction at the PGA 3.

In this embodiment, the amplification factor of the output voltage in the ADC 4 can be changed by changing settings of the capacitance ratio Cout2/Cin2 and the output voltage Vdac of the DAC 45. Therefore, the output voltage Vout may be amplified fourfold only in the amplification mode and amplified twofold thereafter, or alternatively, the output voltage Vout may be amplified twofold only in the amplification mode and amplified fourfold thereafter. Note that the amplification factor of the output voltage Vout is not limited to 2 or 4. The amplification factor in the amplification mode may be a value exceeding 1.

In addition, repeating the signal amplification phase T21 and the amplified-signal input phase T22 not only once but a plurality of times makes it possible for the ADC 4 to further amplify a voltage output as a result of the data input phase T2.

Furthermore, the operation in the signal amplification phase T21 involves a shorter stabilization period than that in the hold phase T3 in which similar operation is performed. Therefore, by executing the signal amplification phase T21 in a shorter time than that of the hold phase T3, the amplification mode takes a shorter period.

Although the above-described embodiment is an example of configuration of the CMOS line sensor 20, the present invention is not limited to this example and may be applied to configuration of a charge-coupled device (CCD) line sensor.

As described above, according to the image capturing device of the embodiment, it is possible to reduce a gain assigned to a PGA and assign the reduction of the gain to an ADC. In addition, according to the image capturing device of the embodiment, it is possible to assign a gain to the ADC 4 without changing the circuit configuration of the ADC 4 itself but by changing the circuit configuration by control of the connection in the ADC 4. Consequently, an area corresponding to a gain assigned to a PGA can be reduced, and an area occupied by the PGA can be thereby reduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An image capturing device, comprising:
    a pixel circuit to output a photoreception signal;
    a programmable-gain amplifier to amplify the photoreception signal with a first gain;
    an analog-to-digital conversion circuit to further amplify the amplified signal, which was amplified with the first gain by the programmable-gain amplifier, with a second gain to generate a further-amplifier signal, and digitally convert the further-amplified signal into a digital signal, the analog-to-digital conversion circuit having a circuit configuration that changes based on externally applied control signals; and
    a control circuit to control the analog-to-digital conversion circuit to further amplify the amplified signal and digitally convert the further-amplified signal by transitioning the analog-to-digital conversion circuit through a sequence of phases having correspondingly different configurations, using the control signals.

2. The image capturing device according to claim 1, wherein
    the analog-to-digital conversion circuit is a cyclic analog-to-digital conversion circuit, and
    the control circuit is configured to cause the amplified signal to be further amplified with the second gain by changing the circuit configuration of the analog-to-digital conversion circuit.

3. The image capturing device according to claim 2, wherein the analog-to-digital conversion circuit includes:
    a comparator to convert, to the digital signal, a signal voltage Vout(i) sampled based on the further-amplified signal;
    a digital-to-analog conversion circuit to which the digital signal output from the comparator is fed back, and which outputs an analog signal voltage Vdac; and
    a circuit to output, when the output from the digital-to-analog conversion circuit is controlled to be connected and input to the circuit, a signal satisfying the amplified signal voltage Vout(i+1)=2×Vout(i)−Vdac to the comparator, and
    the control circuit is configured to fix the analog signal voltage Vdac of the digital-to-analog conversion circuit to a constant level, and control the output from the digital-to-analog conversion circuit to be connected and input to the circuit.

4. The image capturing device according to claim 3, wherein the control circuit is configured to cause the comparator to repeatedly output a signal voltage Vout(i+1) satisfying Vout(i+1)=2×Vout(i)−Vdac by repeating, a plurality of times, the control of connection and input in a state where the analog signal voltage Vdac of the digital-to-analog conversion circuit is released from the fixed state.

5. The image capturing device according to claim 3, wherein a bit output system used in analog-to-digital conversion in the analog-to-digital conversion circuit is based on a setting of determination criteria of the comparator.

6. The image capturing device according to claim 1, wherein the programmable-gain amplifier is a capacitive-coupling type programmable-gain amplifier configured to perform offset correction.

7. The image capturing device according to claim 1, wherein a range of input voltages to the analog-to-digital conversion circuit is set based on a reference voltage of the programmable-gain amplifier.

8. The image capturing device according to claim 1, wherein the analog-to-digital conversion circuit performs analog-to-digital conversion of 1.5 bits per cycle.

9. The image capturing device according to claim 1, wherein the analog-to-digital conversion circuit performs analog-to-digital conversion of 2.5 bits per cycle.

10. The image capturing device according to claim 1, wherein the image capturing device is a CMOS line sensor.

11. The image capturing device of claim 1, wherein the control circuit is further configured to control the analog-to-digital conversion circuit in accordance with the sequence of phases, which include a reset phase, a data input phase, a hold phase, and a sample phase.

12. The image capturing device of claim 1, wherein the sequence of phases of the analog-to-digital conversion circuit further include a signal amplification phase and an amplified-signal input phase.

* * * * *